Patented Dec. 17, 1940

2,225,160

UNITED STATES PATENT OFFICE 2,225,160

OPAQUE WHITE GLAZE FOR DECORATING GLASSWARE

Alden J. Deyrup, Elizabeth, N. J., assignor to E. I. du Pont de Nemours & Company, Wilmington, Del., a corporation of Delaware No Drawing. Application March 17, 1937, Serial No. 131,529

8 Claims. (Cl. 106—36.2)

This invention relates to the decoration of glassware with a white ceramic glaze. More particularly, the invention is directed to the decoration of glassware with an improved white opacified glaze, containing titanium, and to new opaque white glaze compositions for decorating such glassware.

Glazes for decorating glassware have been in general use for a number of years. Ordinarily the glazes employed for this purpose have consisted of a frit of a low-melting glass composition. As the low-melting glass compositions it has been customary to utilize the lead borosilicates. Borosilicates of lead are usually prepared by melting together an oxide of lead, boric acid and silica in such proportions as to yield a glass having a suitable low melting point. It is usual to pour the melt into a body of water while it is still molten, and this operation, termed "fritting," results in a coarsely comminuted low-melting glaze which is usually termed a "frit" in the industry.

In the preparation of glazes for decorating glassware it has been customary to add to the lead borosilicate frit a ceramic pigment or a white opacifier, the mixture then being ground to a suitable fineness. The finely divided colored or opacified glaze may then be applied to the glass or other similar ceramic surface by brushing, spraying, or other suitable procedure. In order to suspend the glaze so as to permit brushing or spraying, it has been customary to utilize a suitable vehicle which will burn out during the ensuing firing operation without injuring either the glaze or the glass surface.

When the glassware has been coated with the colored or opacified glaze, by one of the methods specified or by any other procedure, it is then heated to a temperature at which the glaze melts to a glossy surface having the required decorative properties. This temperature must be one below the temperature at which the glass object coated would begin to soften or melt. The lead borosilicate glazes ordinarily employed melt well below 1200° F., at which temperature softening or deformation of the glass body coated, with consequent impairment in value of the glassware, will not occur to any appreciable extent. The result of the process described is the formation of a glossy colored or glossy opaque coating or decoration on the glass object which has been treated.

Among opacifiers utilized in compounding opaque white glazes for the decorating of glassware, it has been customary to employ certain white compounds or oxides such as zirconium oxide, zirconium silicate, or lead molybdate. The ceramic opacifiers are generally characterized by high refractive index, whiteness and lack of reactivity with and insolubility in the low-melting glass base. The requirement that the opacifier be insoluble in the glaze, and that it shall not be reactive therewith, necessitates the careful selection of opacifiers having the specific properties outlined by means of skillful and detailed experimentation. Moreover, the properties rendering an opacifier satisfactory for use in one type of enamel do not necessarily mean that the opacifier would be equally suitable for use in other types of enamel. This is because the characteristics rendering an opacifier valuable in one type of composition are highly specific to that opacifier and that composition. As an example, lead molybdate, which is a very satisfactory glass glaze opacifier, is of no value in sheet steel enamels. On the other hand, the oxides of tin and antimony, which are very satisfactory for use in opacifying metal enamels, are of little value as white opacifiers for enamels used for decorating glassware.

The use of titanium dioxide as an opacifier in certain types of ceramic glazes, in particular, the fluorine-free enamels used for enamelling sheet steel articles, has already been suggested. Previously, it has not been possible to utilize titanium dioxide as an opacifier in glazes for decorating glassware, however, because it has been found that it imparts a yellow coloration, rather than white, to such glazes. Moreover, this yellow color becomes deeper and the opacity decreases as the temperature at which the decoration is fired becomes more elevated. As a result, manufacturers engaged in applying decorations to glassware have been unable to control, in practice, the degree of heat so that absolutely uniform results could be obtained. For this reason it was the general conclusion that titanium dioxide imparted to low-melting glazes an unstable color and opacity. Even when yellowish-white glazes were desired, the manufacturers did not hazard the inclusion of titanium dioxide in the low-melting frits because the results were always variable and depended upon a variety of factors which could not be effectively controlled during manufacturing operations.

It has now been found that it is possible to prepare an opacified lead silicate or borosilicate glaze which will be very opaque in character and very satisfactory in whiteness, utilizing milled-in titanium dioxide as the opacifying agent.

Moreover, it has been discovered that when this glaze is fired on glassware objects at temperatures of about 1000 to 1100° F., for periods of from 5 to 20 minutes, the glaze will melt to a glossy surface which will be very satisfactory in color and very opaque, and which will remain so over the range of firing temperatures normally encountered or used by manufacturers engaged in the commercial decoration of glassware.

Accordingly, it is an object of this invention to utilize titanium dioxide as an opacifying agent in glazes of low-melting point, such as are utilized for decorating glassware, under conditions wherein the fired glaze will possess superior whiteness and opacity of a very high order. Moreover, it is another object of this invention to incorporate titanium dioxide as an ingredient in low melting glazes of the type used for decorating glassware under conditions wherein the decorated glassware, with the glaze fired thereon, will possess the same white, opaque, glossy surface, regardless of the temperature at which firing occurs. In other words, it may be stated that an important object of this invention is the preparation of a glaze yielding a white opaque coating which will result in substantial uniformity of color and opacity regardless of the particular temperature conditions (within the range operable for firing these glazes) encountered during the commercial decoration of glassware. These and still further objects of my invention will be apparent from the ensuing disclosure of a preferred method of decorating glassware, and of compositions for use in so decorating, which, when utilized for decorating, will result in the advantages described.

It has been found that a suitable opaque white glaze can be prepared by making an intimate, mechanical mixture of finely-divided titanium dioxide with a finely-divided, low-melting glaze such as one comprising oxide of silica, oxide of lead, and one or more compounds from the group comprising boric oxide, titanium dioxide, alkali metal oxides, and the fluorides of the alkali metals and of ammonium. The proportions in which these various ingredients should be present are more narrowly defined below.

It has been found necessary in order to secure a satisfactory low-melting glaze, of superior fineness and opacity, capable of use commercially for decorating glassware, regardless of the variations in firing temperature which may be found in various manufacturing establishments, to restrict the quantity of lead oxide to an amount now exceeding 75% of the frit and to insure the presence of silica at least in the amount of 15% of the frit. It has also been found highly beneficial, though not essential, to melt from 2 to 8% of titanium dioxide into the flux batch of the glaze composition. This results in improved opacity, whiteness and gloss. However, merely melting titanium dioxide into the flux does not by itself afford sufficient opacity and satisfactory whiteness and I have found that it is also necessary to mix a certain amount of titanium dioxide with the flux or frit, after melting, by mechanical mixing methods such as by milling, in order to secure glazes for decorating glassware having the desired properties.

It has also been found preferable, but not essential, to incorporate in the flux batch from 3 to 10% of an alkali metal fluoride or of ammonium fluoride. The addition of one or more of these fluorides results in a lowered melting point and does not impair the stability of the whiteness and opacity imparted to the fired glaze by the titanium dioxide opacifying agent.

As examples of batch compositions which will result in superior white, opaque glass enamels of low melting point having the improved properties specified, the following may be given:

*Batch "A"*

| | Parts |
|---|---|
| Red lead | 51 |
| Boric acid | 11 |
| Flint | 29 |
| Titanium dioxide | 3 |
| Sodium fluoride | 4 |
| Ammonium bifluoride | 2 |

*Batch "B"*

| | Parts |
|---|---|
| Red lead | 64 |
| Boric acid | 15 |
| Flint | 15 |
| Titanium dioxide | 6 |

*Batch "C"*

| | Parts |
|---|---|
| Red lead | 64 |
| Soda ash | 8 |
| Flint | 28 |

*Batch "D"*

| | Parts |
|---|---|
| Red lead | 55 |
| Boric acid | 12 |
| Flint | 27 |
| Sodium fluoride | 4 |
| Ammonium bifluoride | 2 |

*Batch "E"*

| | Parts |
|---|---|
| Red lead | 62 |
| Boric acid | 12 |
| Flint | 26 |

*Batch "F"*

| | Parts |
|---|---|
| Red lead | 46 |
| Boric acid | 28 |
| Flint | 20 |
| Titanium dioxide | 2 |
| Sodium fluoride | 4 |

In preparing glaze compositions from each of these batches the mixture is first melted at a temperature of 800 to 1100° C. (1470 to 2012° F.). When the mixtures have ceased to froth and while still molten, they are poured into water or onto a clean, cold surface. This results in a coarsely comminuted frit which may then be opacified by the addition of titanium dioxide, by grinding 97 parts of the frit with 3 parts of titanium dioxide. Although about 3% of $TiO_2$ milled into the frit may be regarded as the preferred amount, my invention may be practiced by milling in titanium dioxide in amounts ranging from 1 to 10% by weight, based on the weight of the glaze. When grinding 100 grams of this mixture in a one-pound ball mill containing about one pound of stones and 40 cubic centimeters of water, it has been found that a grinding period of about 12 hours at 60 revolutions per minute is required in order to admix thoroughly the opacifier and glaze, and to produce an opacified glaze of the fineness desired for spraying, brushing, or printing operations when applied to glassware.

The opacified glazes prepared by milling the titanium dioxide opacifier with the frits resulting from the melting of Batches "A" to "F" may then be mixed by technique now well known in the art and applied to the surface of the glassware to be decorated. This usually involves suspending the glaze composition in a suitable vehicle so that it may be applied to the glass surface by usual methods. The decorated glass surface may then be heated to a temperature of about 1050° F., for a period of from 10 to 15 minutes. During this period of heating, the opacified glaze will melt and the glass object will then be decorated with a glossy, firmly adherent opaque white glaze. While all the glazes prepared from Batches "A" to "F" will have stable white opaque surfaces when fired on tumblers, vases and similar glassware, the temperature of the articles being maintained below the temperature (about 1150° F.) at which deformation of the glassware would occur, it has been found that a glaze prepared from the batch designated as Batch "F" possesses superior stability when it is desired to apply a white glaze to a flat piece of glass and then, simultaneously, melt the glaze and deform the glass object to a pre-determined shape. This is a common practice in the manufacture of decorated glass signs, and for this purpose I prefer to utilize Batch "F" which will result in a glaze remaining white, even when fired at temperatures more elevated than 1200° F., such as at 1400° F.

The new opaque white glazes have been found to possess a higher degree of whiteness and opacity than is obtainable by utilizing an equal percentage of any other opacifier now in common use for glassware glazes. Moreover, they can be fired over any range of firing temperatures commonly used in the decorating of glassware without injury to the white or opaque characteristics of the glaze.

These results are to be sharply contrasted with the older types of enamels to which titanium dioxide has been added by milling alone. These frits have been found to yield a glossy surface, but the color has varied from cream to yellow, the exact shade of the cream or yellow color being extremely susceptible to change by practically unavoidable fluctuations in the temperatures employed in commercial firing operations. As a result, the frits formerly known to the art, containing milled-in titanium dioxide, have not been capable of being used in the commercial decoration of glassware.

While the batch compositions previously given may be regarded as preferred compositions, the invention is by no means restricted to the use of the various ingredients in the proportions specified therein. Considerable variations may be made in the relative percentages without losing the advantageous characteristics of the new enamels. Thus, glaze compositions having ingredients present within the limits specified in the table below will result in glazes suitable for decorating glassware, yielding decorations of superior whiteness and opacity when these glaze compositions are ground with from 1 to 10% of titanium dioxide before being melted and applied to the glassware. It may be noted that titanium dioxide of paint pigment grade has been found entirely suitable for use in preparing these glazes.

Table I

For a $PbO.B_2O_3.SiO_2$ glaze, the following range of proportions has been found to yield satisfactory glazes.

| | Per cent |
|---|---|
| PbO | 35–65 |
| $B_2O_3$ | 10–40 |
| $SiO_2$ | 25–60 |

Table II

For a $PbO.B_2O_3.TiO_2.SiO_2$ glaze, the following range of percentages has been found to yield decorating compositions having the desired properties:

| | Per cent |
|---|---|
| PbO | 35–75 |
| $B_2O_3$ | 5–25 |
| $SiO_2$ | 15–50 |
| $TiO_2$ | 2–8 |

Table III

For glazes having the composition $PbO.B_2O_3.SiO_2.RF$ where RF represents sodium, potassium, lithium or ammonium fluoride or any mixture of these fluorides, the following proportions have been found to yield satisfactory glazes:

| | Per cent |
|---|---|
| PbO | 35–65 |
| $B_2O_3$ | 10–40 |
| $SiO_2$ | 10–60 |
| RF | 2–8 |

Table IV

For a glaze having the composition $PbO.B_2O_3.TiO_2.SiO_2.RF$ where RF represents the fluorides of sodium, potassium, lithium or ammonium, or any mixture thereof, the following proportions have been found satisfactory:

| | Per cent |
|---|---|
| PbO | 35–75 |
| $B_2O_3$ | 5–25 |
| $SiO_2$ | 15–50 |
| $TiO_2$ | 2–8 |
| RF | 2–8 |

Table V

For a glaze having the composition $PbO.SiO_2.M_2O.TiO_2$ where $M_2O$ represents sodium oxide, potassium oxide or lithium oxide, or any mixture of these oxides, the following proportions have been found suitable:

| | Per cent |
|---|---|
| PbO | 35–70 |
| $SiO_2$ | 15–50 |
| $M_2O$ | 5–15 |
| $TiO_2$ | 2–8 |

The percentages in these tables represent the weight percent of the oxide reckoned on the total weight of the melted frit. The titanium dioxide present in these compositions represents that amount of titanium dioxide which is melted into the frit. As previously specified, this percentage does not include the additional 1 to 10% of titanium dioxide which is subsequently milled-in with the frit composition before that composition is applied to the glassware to be decorated.

The raw materials used in making these glazes may be selected from a wide variety of chemical compounds of the elements specified. Thus the lead oxide may be obtained from litharge, red lead, lead nitrate or similar compound of lead. The silica may be secured by using sand, flint, or any other convenient source. The alkali metal oxide may be obtained by utilizing the hydroxides, carbonates, nitrates, or other salts which will yield the oxides during melting, of the metals sodium, potassium or lithium. The titanium dioxide in the frit batch may be secured by melting in with that batch either titanium dioxide, titanium sulphate, or various metallic titanates, such as those of lead and sodium. It has also been found that the alkali metal or ammonium fluoride may be successfully introduced as cryolite without deleteriously affecting the result. The amounts of the various ingredients may be proportioned within the limits indicated in the foregoing tables by calculations well known to those skilled in the art.

The components of the frit need not be melted together under any definitely fixed conditions of temperature or time. It is merely necessary to bring the mixture to the melting point and to hold it there for a sufficient period of time so that the components react to form molten glass and to insure the removal of any bubbles present in the melt.

As an alternative procedure to the step of pouring the molten frit into water, other methods of disintegration may be employed, such as pouring the molten batch on a convenient, inert, clean surface. It may then be crushed and ground during the milling operation wherein it is thoroughly intermingled with the opacifying agent.

Moreover, the mixing and grinding of the frit and of the titanium dioxide need not be carried out in one operation as described. Finely ground frit and finely ground titanium dioxide may be mixed subsequent to having been milled in separate operations with equal success.

Although glossy enamels have been referred to, it is not my intention to limit the utility of my new glaze compositions merely to the production of glossy decorations. By varying the ratio of frit to milled-in titanium dioxide it is possible to produce glazes yielding matte or semi-glossed, opaque, white surfaces, as desired.

Any of the well known ceramic pigments may be introduced into my improved white glazes if it is desired to produce tinted whites or delicate shades of color such as red or blue. If desired, it is also possible to utilize, in addition to the titanium dioxide, other white ceramic opacifiers as ingredients in my glaze compositions. Other ceramic materials may also be included in the raw batch of my flux without departing from the percentage limits of the essential constituents as specified in the foregoing tables. Such additional ceramic materials may include cadmium oxide, cobalt oxide and zinc oxide.

Since it is obvious that various changes and modifications may be made in the foregoing description without departing from the nature or spirit thereof, the invention is not to be restricted except as is necessitated by the appended claims.

I claim:

1. A glaze for decorating glassware maturing below about 1200° F. and comprising a mechanical mixture of finely-divided titanium dioxide in amounts ranging from 1 to 10% by weight, based on the weight of said glaze, with a finely-divided frit which comprises lead oxide in amounts ranging from 35 to 65%, silica in amounts ranging from 25 to 60%, and boric oxide in amounts ranging from 10 to 40%, said percentages of said ingredients present in the frit being by weight, based on the total weight of said frit.

2. A glaze for decorating glassware maturing below about 1200° F. which comprises a mechanical mixture of finely-divided titanium dioxide with a frit which is substantially lead borosilicate, said frit containing in addition to lead oxide, silica, and boric oxide, a fluoride selected from the group which consists of the fluorides of sodium, potassium, lithium and ammonium.

3. A glaze for decorating glassware maturing below about 1200° F. which comprises a mechanical mixture of finely divided titanium dioxide with a frit consisting substantially of lead borosilicate, said frit containing lead oxide in amounts ranging from 35 to 65% by weight based on the weight of the frit, boric oxide in amounts ranging from 10 to 40% by weight based on the weight of the frit, and silica in amounts ranging from 25 to 60% by weight based on the weight of the frit.

4. A glaze for decorating glassware maturing below about 1200° F. which comprises a mechanical mixture of finely-divided titanium dioxide with a frit consisting substantially of lead borosilicate, said frit comprising lead oxide in amounts ranging from 35 to 65%, silica in amounts ranging from 15 to 60%, boric oxide in amounts ranging from 10 to 40%, and a fluoride selected from the group which consists of sodium, potassium, lithium, and ammonium fluorides, in amounts ranging from 2 to 8%, said percentages being by weight based on the total weight of said frit.

5. A glaze for decorating glassware maturing below about 1200° F. which comprises a mechanical mixture of finely-divided titanium dioxide with a frit consisting substantially of lead silicate, said frit comprising lead oxide in amounts ranging from 35 to 70%, silica in amounts ranging from 15 to 50%, and an alkali metal oxide selected from the group which consists of the oxides of sodium, potassium, and lithium, in amounts ranging from 5 to 15%, and titanium dioxide in amounts ranging from 2 to 8%, said percentages being by weight based on the total weight of said frit.

6. A glaze for decorating glassware maturing below about 1200° F. which comprises a mechanical mixture of finely-divided titanium dioxide with a frit which consists substantially of lead borosilicate, said frit comprising lead oxide in amounts ranging from 35 to 75%, silica in amounts ranging from 15 to 50%, boric oxide in amounts ranging from 5 to 25%, titanium dioxide in amounts ranging from 2 to 8%, and a fluoride selected from the group which consists of sodium, potassium, lithium, and ammonium fluorides, said fluoride being present in amounts ranging from 2 to 8%, all of said percentages being by weight based on the total weight of said frit.

7. A glaze for decorating glassware maturing below about 1200° F. which comprises a mechanical mixture of finely-divided titanium dioxide with a frit which is substantially lead borosilicate, said frit containing lead oxide in amounts ranging from 35 to 65%, silica in amounts ranging from 15 to 60%, boric oxide in amounts ranging from 10 to 40% and a mixture of fluorides selected from the group which consists of sodium, potassium, lithium, and ammonium fluorides in amounts ranging from 2 to 8%, said percentages being by weight based on the total weight of said frit.

8. A glaze for decorating glassware maturing below about 1200° F. which comprises a mechanical mixture of finely divided titanium dioxide with a frit which is substantially lead borosilicate, said frit comprising lead oxide in amounts ranging from 35 to 75%, silica in amounts ranging from 15 to 50%, boric oxide in amounts ranging from 5 to 25%, titanium dioxide in amounts ranging from 2 to 8% and a mixture of fluorides selected from the group which consists of the fluorides of sodium, potassium, lithium, and ammonium in amounts ranging from 2 to 8%, said percentages being by weight based on the total weight of said frit.

ALDEN J. DEYRUP.

CERTIFICATE OF CORRECTION.

Patent No. 2,225,160. December 17, 1940.

ALDEN J. DEYRUP.

It is hereby certified that error appears in the printed specification of the above numbered patent requiring correction as follows: Page 2, first column, line 55, for the word "now" read --not--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.